United States Patent Office 3,755,592
Patented Aug. 28, 1973

3,755,592
METHOD OF PREPARING HIGH CONCENTRATION CALCIUM ASCORBATE REACTION PRODUCTS AND PRODUCTS PRODUCED BY SAME
Gerhard W. Ahrens, 1781 E. 15th St., Brooklyn, N.Y. 11229
No Drawing. Continuation-in-part of abandoned application Ser. No. 805,029, Mar. 6, 1969. This application Mar. 23, 1971, Ser. No. 127,391
Int. Cl. A61k *15/12*
U.S. Cl. 424—280                            4 Claims

ABSTRACT OF THE DISCLOSURE

Novel high concentration calcium ascorbate preparations are formed which essentially consist of a series of from liquid to solid reaction products resulting from the reaction of up to 82 parts by weight percent, on the total weight of the reaction product, of nonhygroscopic calcium ascorbate dihydrate with not less than 18 parts by weight, on the total weight of the reaction product, of an anhydrous hydroxypropane derivative having from 2 to 3 hydroxy groups selected from the group including 1,2-dihydroxypropane and trihydroxypropane. The resulting of reaction products supply per gram reaction product up to 672 mgs. active L-ascorbic acid or vitamin C and up to 78 mgs. of ionic calcium upon ionization of the calcium ascorbate contained therein. The reaction products result from the application of heat to admixed calcium ascorbate dihydrate and anhydrous hydroxypropane derivatives at a reaction temperature which is limited to temperature exposure levels at which the calcium ascorbate dihydrate will not lose more than one molecule of its water of hydration. The resulting products are extremely stable and useful in medical, pharmaceutical and dermatological preparations, as such or when added to suitable carriers having constituents compatible with the anhydrous hydroxypropane derivatives.

---

This application is a continuation-in-part of Ser. No. 805,029, filed Mar. 6, 1969, which was co-pending herewith, but is now hereby terminated.

This invention relates to new calcium ascorbate preparations and, in particular, to high concentration preparations of calcium ascorbate essentially consisting of reaction products of non-hygroscopic calcium ascorbate dihydrate of the formula $(C_6H_7O_6)_2Ca \cdot 2H_2O$ with anhydrous hydroxypropane derivatives having from 2 to 3 hydroxy groups, selected from the group including 1,2-dihydroxypropane and trihydroxypropane, in which the concentration of the calcium ascorbate dihydrate constituent is far larger than would normally dissolve in the anhydrous hydroxypropane derivatives. The reaction products thus obtained provide far larger concentrations of calcium ascorbate dihydrate than would normally dissolve in the anhydrous hydroxypropane derivatives. The products of the invention, are characterized by possessing extremely stable, clear, homogeneous consistencies, having the therapeutic properties of the calcuim ascorbate constituent portion therein and, in addition, also the antimicrobial properties of the anhydrous 1,2-dihydroxypropane constituent therein where the same is used as the co-constituent with the calcium ascorbate in the reaction products.

The preparation and availability of such high concentration calcium ascorbate products in a stable form opens up utility for calcium ascorbate. The formation of calcium ascorbate preparations at higher and more stable concentrations than ever before this invention constitutes a major advance in utilizing the known therapeutic properties of calcium ascorbate. It is obvious that the availability of higher concentrations of calcium ascorbate should increase its therapeutic effectiveness and this, combined with the higher stability, should account for a major increase in the utility of calcium ascorbate wherever the same is used medically, pharmacologically and dermatologically, for instance as parenteral preparations in the treatment of vitamin C and/or calicum deficiencies, or as a novel liniment-type therapeutic agent or as ingredient of anhydrous skin creams in the treatment of sores, wounds, burns, bruises, cuts and cracks of the skin and lips, itching, infective and dermatosic skin conditions including such caused by hypocalcemia, that is in conditions where the benefits of using calcium ascorbate are derived from its properties such as its hemostatic, antiphlogistic, antitraumatic, antisensitizing, antidermatosic, soothing and itch alleviating properties, depending on the available local concentration of the same. Other applications of the new availability high concentration calcium ascorbate preparations of high stability include their use in the treatment of conditions of the oral cavity where the antipyorrheaic and anticariogenic effects of calcium ascorbate may be of value, for instance as an oral lozenge which slowly dissolves in the mouth and exerts a direct effect on infectious conditions, inflammations and the like without being cariogenic. Such oral products supply up to 672 mgs. of active l'ascorbic acid per gram of product and up to 78 mgs. ionic calcium and exert a strong local antimicrobial and antivirus effect not only by virtue of the l'ascorbic acid content but also by virtue of the presence in the product of 1,2-dihydroxypropane. The latter is the preferred hydroxypropane derivative with which the calcium ascorbate dihydrate constituent of the preparation of the invention is reacted for the purpose of producing high concentrated solid and hard candy-like calcium ascorbate products. Closely aligned with the above usage of said hard candy-like high concentrated calcium ascorbate product is its new use as an ingredient of candies and/or lozenges to counteract the cariogenic effects of sugar and other essential constituents in such candies and lozenges, thereby, however, not only conferring anticariogenic properties upon said candies and lozenges but also, in addition, the general therapeutic effects of calcium ascorbate and the antimicrobial effects of 1,2-dihydroxypropane, which constituent is also in this case the preferred hydroxypropane derivative with which the calicum ascorbate constituent of the preparation of the invention is reacted. Although the employment of trihydroxypropane in preparing these hard candy-like reaction products is feasible, it is not the preferred form for practical reasons, as it is not as brittle and workable a product for incorporation into a candy mass as the product derived from the employment of 1,2-dihydroxypropane, which can be easily powdered and feels dry to the touch in contrast to the more tenacious, less brittle and more difficult to pulverize product yielded by employing trihydroxypropane.

A further new use made possible by the invention is the employment of the high concentration calcium ascorbate preparation as an anticariogenic additive to drinks such as sodas, lemonades, fruit juices and the like, to counteract the cariogenic effects of ingredients in said drinks and at the same time adding active l'ascorbic acid or vitamin C, in the non-cariogenic form as calcium ascorbate, to the said drinks as well as ionic calcium. The preferred hydroxypropane derivative for use in preparations of the invention to serve as additive to drinks is trihydroxypropane for the implicit reason of having a sweetish taste in contrast to the acridic taste of 1,2-dihydroxypropane which, although allowed by the Food and Drug Administration for applications in foods, would be not as desirable therein as is trihydroxypropane.

As an ingredient of anhydrous stable skin creams, the use of the preparations of the invention constitutes the creation of the first smooth, stable and homogeneous skin cream with calcium ascorbate ever produced and represents the first such skin cream capable of actively supplying active l'ascorbic acid or vitamin C and ionic calcium to the skin by ionization of calcium ascorbate which the latter undergoes when coming in contact with living tissue and skin. The amounts of available l'ascorbic acid and ionic calcium from the ionization of the said calcium ascorbate contained in such creams depends of course on the amounts of calcium ascorbate available as a constituent of such creams corresponding to from 34 mgs. to 350 mgs. of active l'ascorbic acid and from 4 mgs. to 40 mgs. ionic calcium for each gram of cream formulated as hereinafter described.

Although the employment of hydrous hydroxypropane derivatives having from 2 to 3 hydroxy groups (in contrast to the anhydrous derivatives used in this invention) such as the 1,2-dihydroxypropane or the trihydroxypropane in making solutions of calcium ascorbate dihydrate give higher concentrated calcium ascorbate preparations, such hydrous derivatives cannot be employed if a stable endproduct is to be obtained. The hydrous derivative preparations lack stability and are subject to formation of breakdown products therein and degradations as result of storage. Moreover, it is possible to dissolve calcium ascorbate dihydrate in anhydrous hydroxypropane derivatives at lower temperature than employed in this invention, but such products contain only minute concentrations of calcium ascorbate dihydrate. The latter can be dissolved in anhydrous hydroxypropane derivatives only in extremely low concentrations, for instance by agitating mixtures of these ingredients for extended periods of time too uneconomical to be useful or by heating such mixtures to the limiting temperature exposure levels of between 130° F. to 140° F. heretofore thought to be necessary to avoid damage to the calcium ascorbate dihydrate constituent in such mixture unless limited to relatively short periods of time. Even though quite homogeneous and clear solutions can thus be obtained, only a slight but still unsatisfactory increase in the concentration of dissolved calcium ascorbate dihydrate in the said nonhydrous hydroxypropane derivatives is brought about. No reaction, however, between the calcium ascorbate dihydrate and the nonhydrous hydroxypropane derivatives appears to take place and no reaction product having far higher calcium ascorbate dihydrate concentrations than would normally dissolve in nonhydrous hydroxypropane derivatives is obtained. In contrast, the process of the invention, produces much higher concentrated and therefore more effective calcium ascorbate preparations by virtue of the formation of reaction products of calcium ascorbate dihydrate with anhydrous hydroxypropane derivatives and in such short time periods as to amount to only a fraction of time heretofore consumed in obtaining mere solutions of calcium ascorbate dihydrate in the said anhydrous hydroxypropane derivatives as described above.

According to my invention nonhygroscopic calcium ascorbate dihydrate is reacted with anhydrous hydroxypropane derivatives having from 2 to 3 hydroxy groups such as 1,2-dihydroxypropane and trihydroxypropane at temperature exposure levels that will not cause the calcium ascorbate dihydrate to lose more than one molecule of its water of hydration to form reaction products that have far higher calcium ascorbate concentrations than would normally dissolve in the said anhydrous hydroxypropane derivatives. The reaction products so prepared are characterized by possessing extremely stable, clear and homogeneous and from fluid to solid consistencies the latter increasing with increasing calcium ascorbate concentrations up to 82 parts by weight percent of the reaction products thus obtained. The anhydrous hydroxypropane derivative thereby simultaneously provides a protective environment for the calcium ascorbate dihydrate during the said reaction therewith to render the same nondestructive at said reaction temperatures. The temperature is so selected that it will not cause the calcium ascorbate dihydrate to lose more than one of its molecules of water of hydration during the period of time for such reaction heating for from 3 minutes to around 10 minutes between a temperature range of from 225° F. and 255° F. being sufficient depending on the concentrations of calcium ascorbate dihydrate that must be reacted. The reaction is considered complete when no more crystals of the said calcium ascorbate dihydrate remain in the reaction mixture. The reaction starts as an endothermic reaction, requiring the input of heat to maintain the reaction temperature at reaction level during which the calcium ascorbate dihydrate slowly disappears under the constant agitation that must be applied. However, as soon as the said crystals dissolve, an exothermic reaction sets in which must be strictly avoided and heating immediately discontinued and suitable cooling applied if the temperature rises beyond 255° F. in order to avoid the loss of the second molecule of water of hydration from the calcium ascorbate dihydrate which otherwise would lead to the presence in the reaction product of an extremely unstable, undesirable product. Such loss of the second molecule of water of hydration from the calcium ascorbate dihydrate can also be caused by unduly extending the period of reacting the reaction mixture, even at normal reaction temperatures between 225° F. and 255° F., after all of the calcium ascorbate dihydrate has been reacted. In forming the reaction product of the invention, only one molecule of water of hydration must be lost to the nonhydrous hydroxypropane derivative by the endothermic reaction which first is observed. It is critical that the exothermic reaction following formation of the desired reaction product be avoided. The product of the reaction changes from the liquid and viscous to the solid state with increasing concentration of calcium ascorbate therein. The total processing time for the reaction, including the possible preheating to reaction temperature and cooling below reaction temperature, ranges between no less than 30 minutes to no more than 75 minutes. At even the lowest calcium ascorbate concentrations the products had lost all the irritant properties possessed originally by their constituent hydroxypropane derivatives used therewith in forming the reaction products, so that even the most diluted solutions of the same containing normally irritable proportions of hydroxypropane were free of irritant and harmful effects. The calcium ascorbate in the reaction product thus acted therein as a buffer particularly valuable for parenteral and anti-irritant, anti-phlogistic, itch-relieving, antisensitizing, anti-dermatosic and other effects as described.

For the purposes of the invention, only the anhydrous form of hydroxypropane derivatives are suitable constituents of the novel calcium ascorbate dihydrate preparations as herein described. Furthermore, where the 1,2-dihydroxypropane is employed as the representative hydroxypropane derivative constituent in such preparations instead of the trihydroxypropane, such preparations exhibit certain distinct advantages not possessed by preparations employing trihydroxypropane, in that they are practically nonstick and endowed with antimicrobial properties. The trihydroxypropane, derivatives however, also have desirable properties though higher concentrated preparations exhibit a slight stickiness and their antimicrobial properties amount to no more but some degree of a deterrent action, particularly against molds. Trihydroxypropane is nonfermentable. Used as constituent of parenteral preparations and as additive to drinks, trihydroxypropane is invaluable. Too, for use in stable cream or ointment preparations, the trihydroxypropane derivatives are preferable.

Also noted is that no preparations of the invention require the addition of any preservatives and, since they may be heated to sterilization temperatures without damage, as in the case of parenteral solutions of the invention, such solutions are, in effect, self-sterilizing, and may be diluted at will to any desired concentration of calcium ascorbate. Cream bases, employed in making creams and ointments containing calcium ascorbate preparations of the invention, must be soluble in and compatible with either of the hydroxypropane derivatives employed in manufacturing said calcium ascorbate preparations of the invention. Useful cream bases are edible fatty acid esters selected from the group including glyceryl-mono-laurate, glyceryl-mono-stearate, propylene-glycol-mono-laurate, propylene-glycol-mono-stearate and mannitan-mono-laurate which were tried with success, although creams and ointments prepared in such a manner are light sensitive and should be kept away from light wherein the fatty acid ester constituent base contains a small amount of emulsifying agent such as potassium hydroxide as is often the case in products of this nature. However, this light sensitivity is also an indication of the physiological activity and reactivity of the calcium ascorbate preparation used in making such creams and ointments, causing the release of active l'ascorbic acid or vitamin C and ionic calcium in contact with living tissue by ionization. This is most desirable in utilizing the pharmacological properties of calcium ascorbate. It is not a sign of instability but of reactivity. The preparations of the invention can be stored for years without losing stability and reactivity potentials provided, of course, they are kept in receptacles that are nonreactive and noncatalytic, preferably in glass receptacles. Glass-lined tanks are preferred for carrying out the reactions in manufacturing the reaction products of the invention. Preparations of the invention have been kept in glass vials for many years, without the slightest changes in potencies of stabilities and despite frequent opening of the vials and reclosing the same and without hermetic exclusion of air following reclosing.

The following examples of manufacturing the basic reaction product and preparations of the invention as well as of applicabilities for the same are presented for illustrative purposes only and not for limiting the scope of my invention.

Example of method of preparing the reaction product

After weighing out the proper amounts of calcium ascorbate dihydrate and anhydrous hydroxypropane derivative constituents intended to be reacted with one another to form the reaction product of calcium ascorbate dihydrate with anhydrous hydroxypropane derivatives having from 2 to 3 hydroxy groups selected from the group including 1,2-dihydroxypropane and trihydroxypropane, the constituents are mixed with one another and placed into a closable reaction vessel, preferably of glass or of glass-lined construction, and heated therein under constant agitation until the reaction is started and carried to completion. The reaction between calcium ascorbate dihydrate and the anhydrous hydroxypropane derivative in the reaction vessel starts when the temperature of about 225° F. is reached and is continued within the temperature range up to 255° F. which is the temperature exposure level for calcium ascorbate dihydrate at which the same will not lose more than one molecular of its water of hydration the reaction being continued until all the crystals of calcium ascorbate dihydrate in the reaction mixture have disappeared. This requires from 3 to 10 minutes time and depends largely on the temperature range and the concentration of calcium ascorbate dihydrate in the reaction mixture that must be reacted with the anhydrous hydroxypropane derivative. The resulting reaction product is a clear and homogeneous mass characterized by possessing, on cooling, extremely stable and from slightly viscous to solid consistencies depending, in degree, on the respective calcium ascorbate concentrations therein. Up to 82 parts by weight percent of the reaction product may be calcium ascorbate dihydrate in an active form and capable of releasing upon ionization in contact with living tissue, for instance, active l'ascorbic acid or vitamin C and ionic calcium. The time it takes to produce the reaction products of the invention is not less than 30 minutes and no more than 75 minutes, including preheating and cooling below the reaction temperature of the finished products, but depends also in this respect largely on the concentration of calcium ascorbate desired in the end product and increases with increasing such concentrations in such end products.

Some of the useful compositions of the reaction product of the invention made in the aforedescribed manner and useful as and in a variety of preparations, are the following, without thereby implying limitation thereto:

TABLE

| Composition of reaction product by original ingredients | Examples of compositions—Indicating parts by weight percentages |||||||||||||||||||
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| 1,2-dihydroxypropane | 92.5 | 90.0 | 85.0 | 80.0 | | | | | 75.0 | 70.0 | 65.0 | 60.0 | | | | | 28.0 | 26.0 | 24.0 |
| Trihydroxypropane | | | | | 92.5 | 85.0 | 80.0 | 75.0 | | | | | 70.0 | 60.0 | 50.0 | 18.0 | | | |
| Calcium ascorbate dihydrate | 7.5 | 10.0 | 15.0 | 20.0 | 7.5 | 15.0 | 20.0 | 25.0 | 25.0 | 30.0 | 35.0 | 40.0 | 30.0 | 40.0 | 50.0 | 82.0 | 72.0 | 74.0 | 76.0 |

The compositions 1, 2, 3, 4, 5, 6, 7, 8, 9, 10 have increasing viscosities in that order and compositions 11 and 13 are very viscous and 12, 14 and 15 extremely viscous, whereas 16, 17, 18 and 19 are solids. Composition 16 is a tenacious solid product, but 17, 18 and 19 are brittle and easily pulverized to be added to other products, for instance candies or lozenges. All compositions are non-fermenting and the 1,2-dihydroxypropane preparations are also antimicrobial. Compositions with 1,2-dihydroxypropane are nonsticky but of acrid taste, whereas trihydroxypropane preparations are sweetish to slightly bitter in taste. A series of compositions consisting of or prepared with various of the reaction products set forth in the aforesaid table are described in the following examples:

(A) A parenteral therapeutic calcium ascorbate solution: The product of Example 5 formed by reacting 7.5 parts by weight percent, on the total weight of the solution, of calcium ascorbate dihydrate with 92.5 parts by weight percent trihydroxypropane, is a slightly viscous solution indefinitely stable and will supply per gram of solution 57 mgs. active l'ascorbic acid and about 7 mgs. ionic calcium.

(B) A parenteral therapeutic calcium ascorbate solution: The product of Example 8 formed by reacting 25 parts by weight percent, on the total weight of the solution, of calcium ascorbate dihydrate with 75 parts by weight percent trihydroxypropane, is a viscous solution indefinitely stable and may be diluted with distilled water for use if desired. It supplies 205 mgs. of active l'ascorbic acid and 23.7 mgs. ionic calcium per gram of solution.

It is understood that any intermediate range in the calcium ascorbate content of these parenteral solutions may be substituted for either example.

(C) Liniment-type calcium ascorbate: The products of Examples 1, 2, 3, 4, 9, 10, 11 and 12 formed by reacting from 7.5 parts to 40 parts by weight percent, on the total weight of the solution, of calcium ascorbate dihydrate with from 92.5 parts by weight to 60 parts by weight of 1,2-dihydroxypropane are slightly viscous to viscous solutions are extremely stable and supply from 57 mgs. to 328 mgs. active l'ascorbic acid and from 7.0 to 38.0 mgs. ionic calcium per gram of solution.

It is understood that any further intermediate range in calcium ascorbate content of these solutions may be substituted without thereby limiting the scope of the invention. These solutions are valuable agents for application to sores, wounds, burns, bruises, cuts and cracks of the skin and lips, to itching skin conditions and dermatosic and infected areas of the skin including such due to hypocalcemia. They are hemostatic, antiphlogistic, antitraumatic, antisensitizing, antidermatosic, soothing and itch-relieving as well as antimicrobial. For each purpose separate products may be supplied to the trade, for instance as lip-anticracking agent, as hemostatic agent, as antitraumatic agent, as anti-irritant agent, as anti-itch agent, anti-burn agent and the like. These preparations have all the properties of calcium ascorbate and its ionization products l'ascorbic acid and ionic calcium as well as the antimicrobial properties of 1,2-dihydroxypropane. The high concentrations of available calcium ascorbate in the stable form allows attainment of increased therapeutic effects from calcium ascorbate where applied as medical, therapeutic or antidermatosic agent and not attainable with aqueous preparations. It is understood that instead of the 1,2-dihydroxypropane also the trihydroxypropane may be used, except that such preparations are more or less sticky and possess no antimicrobial properties, whereas preparations with 1,2-dihydroxypropane are non-sticky and possess antimicrobial properties. Too, all the preparations, made with either the 1,2-dihydroxypropane or trihydroxypropane as constituent of the reaction product of the invention, are non-irritant to the skin, in contrast to the irritant effects the nonhydrous hydroxypropane derivatives themselves exert when in contact with the skin. This includes preparations with even less than 7.5 parts by weight percent, on the total weight of the preparation, of calcium ascorbate. Thus, a lip-anticracking agent may have 7.5 to 10 parts by weight percent calcium ascorbate; a hemostatic agent may have 20 to 40 parts by weight calcium ascorbate; an anti-traumatic agent may have 15 to 20 parts by weight calcium ascorbate and be used as packing application to bruises, soaked in cotton fabric or the like; an anti-irritant agent may be supplied as a 5 to 10 parts by weight calcium ascorbate containing preparation and rubbed into the skin or laid upon the skin and permitted to be slowly absorbed; an anti-itch agent may contain from 4 to 10 parts by weight calcium ascorbate and applied directly to the itching skin sections, bringing almost immediate relief; an anti-burn agent may contain from 10 to 30 parts by weight calcium ascorbate but primarily as the reaction product with trihydroxypropane unless, too, the presence of an antimicrobial agent is desired, which requires the use of the 1,2-dihydroxypropane in the reaction product. Preparations to be applied to sores and wounds generally include concentrations with from 7.5 to 10 parts by weight calcium ascorbate and preparations useful against cuts are the same as against bleeding, using the hemostatic agent with from 20 to 40 parts by weight calcium ascorbate. In hypocalcemic conditions and dermatosic conditions caused by such, high calcium concentrations are required in the preparations to be effective and from 20 parts by weight to 40 parts by weight of calcium ascorbate therein should be the rule in order to obtain, upon constant application to such conditions for a relatively long period of time, success, which is co-incident with an increase in the metabolic and blood calcium rate.

(D) Anti-cariogenic calcium ascorbate drink additive: The products of Examples 5, 6 and 7 formed by reacting from 7.5 parts to 20 parts by weight calcium ascorbate with trihydroxypropane from 92.5 parts to 80 parts and supplying from 57 mgs. to 164 mgs. active l'ascorbic acid and from 7.0 to 19.0 mgs. ionic calcium.

These solutions are to be added to drinks which have cariogenic properties such as sodas, lemonades, fruit juices and the like. In doing so, they will counteract these cariogenic properties and thus help to protect the drinker from suffering cariogenic effects. At the same time, however, the drink is enriched by active vitamin C and calcium additions or retarding caries formation. Additions may also be made to milk in the lukewarm or cold condition to enrich the same with vitamin C and calcium, without curdling up. Curdling will start, however, as soon as the milk is heated, indicating the ready availability of the ionization products l'ascorbic acid and calcium to the system, as the same ionization takes place also in the body. A few drops of this additive will suffice to fill the daily requirement for vitamin C. Using of additives having less than 7.5 parts by weight percent calcium ascorbate in the reaction product will not be a deviation from the scope of this invention, except that it would make its use more economical and salable. Aqueous calcium ascorbate additions would not be useful because of the instable character of the same, it could not be stored for any length of time and decomposition products would form on repeated opening and closing of any receptables marketed containing such aqueous solutions. Contrary to this, the products of the invention are stable and not subject to deterioration on repeated opening and closing and can be kept for long periods of time on the shelf.

(E) Therapeutic calcium ascorbate skin cream: Reaction products of slight to very viscous consistencies containing from 7.5 parts by weight to 50 parts by weight calcium ascorbate with 92.5 to 50 parts by weight trihydroxypropane, as per Examples 5, 6, 7, 8, 13, 14, 15 in the table, are combined through thorough mixing and homogenizing with a nonhydrous cream-base material selected from the group of edible fatty acid esters including glyceryl-mono-laurate and propylene-glycol-mono-laurate, glyceryl-mono-stearate, propylene-glycol - mono - stearate and mannitan-mono-laurate, 1,2-dihydroxypropane may be substituted for the trihydroxypropane when antimicrobial properties are desired in the creams prepared therewith.

To form creams, the cream-base material must be used in an amount of from 12.5 parts by weight to 40 parts by weight, on the total weight of the cream, with from 87.5 parts by weight to 60 parts by weight of the reaction product making up the remainder. This enables the formation of a wide variety of creams with a wide variety of calcium ascorbate contents, in fact, it enables the first formation of smooth and elegant creams containing calcium ascorbate capable of ionizing in contact with living tissue to supply from 34 mgs. to 359 mgs. active l'ascorbic acid or vitamin C and from 4.0 mgs. to 40 mgs. ionic calcium per gram of cream.

Absolutely stable skin creams may be prepared but must be protected from light and the ingredients must be free from catalytically active metals. Too, they must be packed in light protective material, free from metal ingredients and the caps must not be metal caps. For ointment use as may be desirable by a physician, shorter-life creams may be made by using other than the preferred cream-base materials, without affecting the effectiveness of calcium ascorbate as a pharmaceutical agent but failing to possess so-called cosmetic elegance. Generally, no white creams can be produced with calcium ascorbate but they have cosmetic elegance and serve the purpose as antidermatosic and therapeutic agents. The creams are useful for the same purposes and applications as are the liniment-type calcium ascorbate products, except, in a cream form, they are stiffer and more substantive even in low calcium ascorbate concentrations. Solutions run.

Some of the cream compositions prepared are as follows:

TABLE OF CREAM COMPOSITIONS

| Ingredients | A | B | C | D | E | F | G | H |
|---|---|---|---|---|---|---|---|---|
| Glycerylmonolaurate | 40.0 | | | | | 40.0 | 20.0 | |
| Glycerylmonostearate | | 15.0 | | | | | | |
| Propyleneglycolmonostearate | | | 15.0 | | | | | |
| Propyleneglycolmonolaurate | | | | 12.5 | | | | 30.0 |
| Mannitanmonolaurate | | | | | 12.5 | | | |
| Reaction product: | | | | | | | | |
| No. 5—7.5% | | | | | | 60.00 | | |
| No. 7—20% | | 85.0 | 85.0 | | | | 80.0 | |
| No. 13—30% | 60.0 | | | | | | | |
| No. 14—40% | | | | | | 87.5 | | |
| No. 15—50% | | | | 87.5 | | | | 70.0 |

These examples shall not be considered restrictive to the scope of the invention and a great many variations are possible, including additions of perfumes, and other ingredients that are noncatalytic to the calcium ascorbate constituent in the reaction product employed in preparing same. Too, the employed reaction products may be replaced by any of those containing 1,2-dihydroxypropane, for instance No. 1 for a 7.5%, No. 4 for a 20%, No. 10 for a 30% and No. 12 for a 40% calcium ascorbate containing reaction product as listed in the table referring to examples of reaction products.

In preparing the creams, I first weigh out the ingredients and add the reaction product to the molten cream base at about a temperature range between 100° F. and 150° F. and mix properly and homogenize. The creams are then filled into neutral receptacles, that is receptacles which are of a noncatalytic material with respect to calcium ascorbate, that is porcelain or glass, or non-porous plastics, with plastic covers. The resulting creams are smooth and elegent and serve their purposes as for use in the treatment of sores, wounds, burns, bruises, cuts and cracks of the skin and lips, itching and dermatosic skin conditions including such due to hypocalcemia, particularly exerting the therapeutic properties of calcium ascorbate and its ionization products formed in contact with living tissue such as ionic calcium and l'ascorbic acid or vitamin C. The hemostatic, antiphlogistic, anti-traumatic, antisensitizing and antidermatosic, soothing and itch alleviating effects of the new creams are outstanding and the creams are also antimicrobially effective where instead of trihydroxypropane the 1,2-dihydroxypropane is the constituent in the reaction product employed in preparing the creams.

(F) Therapeutic calcium ascorbate lozenges: Reaction products are prepared from 72 parts to 78 parts by weight, on the total weight of the reaction product, of calcium ascorbate dihydrate with the nonhydrous 1,2-dihydroxypropane making up the remainer, as per Examples 17, 18 and 19 in the table. They are solid, homogeneous, clear and hard candy-like in consistency and very brittle. They supply per gram reaction product from 590 mgs. to 639 mgs. of active l'ascorbic acid and from 68.4 to 74.1 mgs. ionic calcium upon ionization of the calcium ascorbate constituent therein. These hard and solid materials are shaped or cast in the form of lozenges by application of pressure and cooling. The mouth soluble products thus obtained have a strong mucolytic effect in the mouth and throat cavities, as well as antimicrobial. In addition, liberated 1,2-hydroxypropane on dissolution of the lozenge, enhances this effect by its own antimicrobial potency. It is extremely effective in sore throats and gives immediate relief. It is noncariogenic.

(G) Noncariogenic lozenges with calcium ascorbate: To sugar and other essential candy or lozenge ingredients are added and thoroughly mixed from 0.5 to 20 parts by weight, on the total weight of the candy or lozenge mass, of a reaction product having from 72 to 78 parts by weight percent, on the total weight of the reaction product, calcium ascorbate dihydrate and from 28 to 22 parts by weight of 1,2-dihydroxypropane. The candies or lozenges are formed, after mixing in the desired amounts of the reaction product, in the usual manner, packed and shipped. The added reaction product supplies from about 3 mgs. to 127 mgs. active l'ascorbic acid or vitamin C and from 0.34 to 14.8 mgs. ionic calcium upon ionization of its constituent calcium ascorbate. Ionization takes place in the mouth in contact with living tissue and tissue fluids. The effect of sugar and other constituents in the candies and lozenges that may be procariogenic are counteracted by the presence of the anticariogenic calcium ascorbate product therein. This reaction product is made to a fine powder before mixing with the other ingredients and enhances the antimicrobial, antiphlogistic, anti-inflammatory and other desirable properties of lozenges and candies by adding its own proven properties, respectively those of calcium ascorbate, particularly with respect to its antipyorrheic effectiveness upon inflammatory oral conditions in the mouth and gums.

Having now described my invention as fully as I feel it should be done, the new products being the result of this invention are of such great variety and usefulness in so many fields that any examples given in this specification are merely illustrative and not limiting the scope of the invention.

What I claim is:

1. A method of preparing a reaction product of calcium ascorbate dihydrate with an anhydrous hydroxypropane derivative having from 2 to 3 hydroxy groups, which comprises reacting from 7.5 to 82 parts by weight percentage of calcium ascorbate dihydrate and from 92.5 to 18 parts by weight of said hydroxypropane derivative with one another under agitation, at a temperature of from 225 to 255° F. and continuing the reaction until no more than one molecule of its water of hydration is removed from said calcium ascorbate dihydrate and a clear, crystal-free, homogeneous and stable reaction product having a high concentration of calcium ascorbate is obtained.

2. The method of claim 1 wherein the hydroxypropane derivative is 1,2-dihydroxypropane.

3. The method of claim 1 wherein the hydroxypropane derivative is trihydroxypropane.

4. A calcium ascorbate preparation consisting essentially of the reaction product produced in accordance with claim 1 of up to around 82 parts by weight percent, on the total weight of the reaction product, of calcium ascorbate dihydrate of the formula $(C_6H_7O_6)_2Ca \cdot 2H_2O$ with not less than 18 parts by weight percent, on the total weight of the reaction product, of an anhydrous hydroxypropane derivative having from 2 to 3 hydroxy groups, whereby said reaction product supplies per gram of reaction product up to about the amount of 672 mgs. of active l-ascorbic acid and up to about 78 mgs. of ionic calcium.

References Cited

UNITED STATES PATENTS

| | | | |
|---|---|---|---|
| 2,260,870 | 10/1941 | Ruskin | 424—280 |
| 2,427,692 | 9/1947 | Ruskin | 424—280 |
| 2,676,136 | 4/1954 | Myhre | 424—280 |
| 2,798,023 | 7/1957 | Berger | 424—280 |
| 3,308,217 | 3/1967 | Lowy et al. | 424—280 |

ALBERT T. MEYERS, Primary Examiner

N. A. DREZIN, Assistant Examiner

U.S. Cl. X.R.

424—343

UNITED STATES PATENT OFFICE
CERTIFICATE OF CORRECTION

Patent No. 3,755,592    Dated August 28, 1973

Inventor(s) Gerhard W. Ahrens

It is certified that error appears in the above-identified patent and that said Letters Patent are hereby corrected as shown below:

Column 1, line 25, delete "of"; line 26, after "gram" insert --of--; line 32, delete "ex-".

Column 2, line 9 and line 48, correct "calicum" to read --calcium--;

Column 4, line 64, change "nonstick" to --nonsticky--.

Signed and sealed this 12th day of March 1974.

(SEAL)
Attest:

EDWARD M. FLETCHER, JR.　　　　C. MARSHALL DANN
Attesting Officer　　　　　　　　Commissioner of Patents